(12) United States Patent
Morgan et al.

(10) Patent No.: US 8,244,272 B2
(45) Date of Patent: Aug. 14, 2012

(54) CONTINUOUS DATA OPTIMIZATION OF MOVED ACCESS POINTS IN POSITIONING SYSTEMS

(75) Inventors: Edward J. Morgan, Needham, MA (US); Michael G. Shean, Boston, MA (US); Farshid Alizadeh-Shabdiz, Wayland, MA (US); Russel K. Jones, Roswell, GA (US)

(73) Assignee: Skyhook Wireless, Inc., Boston, MA (US)

( * ) Notice: Subject to any disclaimer, the term of this patent is extended or adjusted under 35 U.S.C. 154(b) by 654 days.

(21) Appl. No.: 11/359,154

(22) Filed: Feb. 22, 2006

(65) Prior Publication Data

US 2007/0004428 A1 Jan. 4, 2007

Related U.S. Application Data

(63) Continuation-in-part of application No. 11/261,988, filed on Oct. 28, 2005, now Pat. No. 7,305,245.

(60) Provisional application No. 60/654,811, filed on Feb. 22, 2005.

(51) Int. Cl.
*H04W 24/00* (2009.01)
(52) U.S. Cl. .............. 455/456.1; 455/456.5; 455/456.6; 455/41.2
(58) Field of Classification Search .................. None
See application file for complete search history.

(56) References Cited

U.S. PATENT DOCUMENTS

| | | | |
|---|---|---|---|
| 4,415,771 A | 11/1983 | Martinez | |
| 4,991,176 A | 2/1991 | Dahbura et al. | |
| 5,315,636 A | 5/1994 | Patel | |
| 5,564,121 A | 10/1996 | Chow et al. | |
| 5,940,825 A | 8/1999 | Castelli et al. | |
| 5,946,615 A | 8/1999 | Holmes et al. | |
| 6,134,448 A | 10/2000 | Shoji et al. | |
| 6,249,252 B1 | 6/2001 | Dupray | |
| 6,262,741 B1 | 7/2001 | Davies | |

(Continued)

FOREIGN PATENT DOCUMENTS

WO    WO-2004/036240    4/2004
(Continued)

OTHER PUBLICATIONS

International Search Report, International Application No. PCT/US07/62721, mailed Nov. 9, 2007. (3 pages).

(Continued)

*Primary Examiner* — Willie J Daniel, Jr.
(74) *Attorney, Agent, or Firm* — Wilmer Cutler Pickering Hale and Dorr LLP

(57) ABSTRACT

Methods and systems of continuously optimizing data in WiFi positioning systems. A location-based services system uses WiFi-enabled devices to monitor WiFi access points in a target area to indicate whether a WiFi access point has moved relative to its previously recorded location. A WiFi-enabled device communicates with WiFi access points within range of the WiFi-enabled device so that observed WiFi access points identify themselves; A reference database is accessed to obtain information specifying a recorded location for each observed WiFi access point in the target area. The recorded location information is used for each of the observed WiFi access points in conjunction with predefined rules to infer whether an observed WiFi access point has moved relative to its recorded location. The reference database is informed of the identity of any observed WiFi access point that is inferred to have moved.

14 Claims, 6 Drawing Sheets

U.S. PATENT DOCUMENTS

| | | | |
|---|---|---|---|
| 6,272,405 B1 | 8/2001 | Kubota et al. | |
| 6,438,491 B1 | 8/2002 | Farmer | |
| 6,625,647 B1 | 9/2003 | Barrick, Jr. et al. | |
| 6,665,658 B1 | 12/2003 | DaCosta et al. | |
| 6,678,611 B2 | 1/2004 | Khavakh et al. | |
| 6,741,188 B1 | 5/2004 | Miller et al. | |
| 6,799,049 B1 | 9/2004 | Zellner et al. | |
| 6,862,524 B1 | 3/2005 | Nagda et al. | |
| 6,888,811 B2 | 5/2005 | Eaton et al. | |
| 6,915,128 B1 | 7/2005 | Oh | |
| 6,956,527 B2* | 10/2005 | Rogers et al. | 342/458 |
| 6,978,023 B2 | 12/2005 | Dacosta | |
| 7,042,391 B2 | 5/2006 | Meunier et al. | |
| 7,120,449 B1 | 10/2006 | Muhonen et al. | |
| 7,123,928 B2 | 10/2006 | Moeglein et al. | |
| 7,167,715 B2 | 1/2007 | Stanforth | |
| 7,167,716 B2 | 1/2007 | Kim et al. | |
| 7,197,556 B1 | 3/2007 | Short et al. | |
| 7,206,294 B2 | 4/2007 | Garahi et al. | |
| 7,250,907 B2 | 7/2007 | Krumm et al. | |
| 7,254,405 B2* | 8/2007 | Lin et al. | 455/456.1 |
| 7,271,765 B2 | 9/2007 | Stilp et al. | |
| 7,305,245 B2 | 12/2007 | Alizadeh-Shabdiz et al. | |
| 7,317,914 B2 | 1/2008 | Adya et al. | |
| 7,323,991 B1 | 1/2008 | Eckert et al. | |
| 7,397,424 B2 | 7/2008 | Houri | |
| 7,403,762 B2 | 7/2008 | Morgan et al. | |
| 7,414,988 B2 | 8/2008 | Jones et al. | |
| 7,417,961 B2* | 8/2008 | Lau | 370/310 |
| 7,433,673 B1 | 10/2008 | Everson et al. | |
| 7,433,694 B2 | 10/2008 | Morgan et al. | |
| 7,471,954 B2 | 12/2008 | Brachet et al. | |
| 7,474,897 B2 | 1/2009 | Morgan et al. | |
| 7,493,127 B2 | 2/2009 | Morgan et al. | |
| 7,502,620 B2 | 3/2009 | Morgan et al. | |
| 7,515,578 B2 | 4/2009 | Alizadeh-Shabdiz et al. | |
| 7,551,579 B2 | 6/2009 | Alizadeh-Shabdiz et al. | |
| 7,551,929 B2 | 6/2009 | Alizadeh-Shabdiz et al. | |
| 7,636,576 B1* | 12/2009 | Pfister et al. | 455/456.6 |
| 7,768,963 B2 | 8/2010 | Alizadeh-Shabdiz | |
| 7,769,396 B2 | 8/2010 | Alizadeh-Shabdiz et al. | |
| 7,818,017 B2 | 10/2010 | Alizadeh-Shabdiz et al. | |
| 2001/0053999 A1 | 12/2001 | Feinberg | |
| 2002/0055956 A1 | 5/2002 | Krasnoiarov et al. | |
| 2002/0080063 A1 | 6/2002 | Bloebaum et al. | |
| 2002/0154056 A1 | 10/2002 | Gaal et al. | |
| 2002/0173317 A1 | 11/2002 | Nykanen et al. | |
| 2002/0184331 A1 | 12/2002 | Blight et al. | |
| 2003/0043073 A1 | 3/2003 | Gray et al. | |
| 2003/0069024 A1 | 4/2003 | Kennedy | |
| 2003/0087647 A1 | 5/2003 | Hurst | |
| 2003/0114206 A1 | 6/2003 | Timothy et al. | |
| 2003/0125045 A1 | 7/2003 | Riley et al. | |
| 2003/0146835 A1 | 8/2003 | Carter | |
| 2003/0225893 A1 | 12/2003 | Roese et al. | |
| 2004/0019679 A1 | 1/2004 | E et al. | |
| 2004/0039520 A1 | 2/2004 | Khavakh et al. | |
| 2004/0058640 A1 | 3/2004 | Root et al. | |
| 2004/0081133 A1 | 4/2004 | Smavatkul et al. | |
| 2004/0087317 A1 | 5/2004 | Caci | |
| 2004/0124977 A1 | 7/2004 | Biffar | |
| 2004/0157624 A1 | 8/2004 | Hrastar | |
| 2004/0162896 A1 | 8/2004 | Cen et al. | |
| 2004/0193367 A1 | 9/2004 | Cline | |
| 2004/0203847 A1 | 10/2004 | Knauerhase et al. | |
| 2004/0203904 A1 | 10/2004 | Gwon et al. | |
| 2004/0205234 A1 | 10/2004 | Barrack et al. | |
| 2004/0263388 A1 | 12/2004 | Krumm et al. | |
| 2005/0020266 A1 | 1/2005 | Backes et al. | |
| 2005/0021781 A1 | 1/2005 | Sunder et al. | |
| 2005/0037775 A1 | 2/2005 | Moeglein et al. | |
| 2005/0043040 A1 | 2/2005 | Contractor | |
| 2005/0055374 A1 | 3/2005 | Sato | |
| 2005/0108306 A1 | 5/2005 | Martizano Catalasan | |
| 2005/0136845 A1 | 6/2005 | Masuoka et al. | |
| 2005/0164710 A1 | 7/2005 | Beuck | |
| 2005/0192024 A1 | 9/2005 | Sheynblat | |
| 2005/0227711 A1 | 10/2005 | Orwant et al. | |
| 2005/0232189 A1 | 10/2005 | Loushine | |
| 2005/0251326 A1 | 11/2005 | Reeves | |
| 2006/0002326 A1 | 1/2006 | Vesuna | |
| 2006/0009235 A1 | 1/2006 | Sheynblat et al. | |
| 2006/0040640 A1 | 2/2006 | Thompson et al. | |
| 2006/0046709 A1 | 3/2006 | Krumm et al. | |
| 2006/0058957 A1 | 3/2006 | Hickenlooper et al. | |
| 2006/0058958 A1 | 3/2006 | Galbreath et al. | |
| 2006/0061476 A1 | 3/2006 | Patil et al. | |
| 2006/0078122 A1 | 4/2006 | Dacosta | |
| 2006/0089157 A1 | 4/2006 | Casey et al. | |
| 2006/0089160 A1 | 4/2006 | Othmer | |
| 2006/0092015 A1 | 5/2006 | Agrawal et al. | |
| 2006/0095348 A1 | 5/2006 | Jones et al. | |
| 2006/0095349 A1 | 5/2006 | Morgan et al. | |
| 2006/0128397 A1 | 6/2006 | Choti et al. | |
| 2006/0197704 A1 | 9/2006 | Luzzatto et al. | |
| 2006/0200843 A1 | 9/2006 | Morgan et al. | |
| 2006/0217131 A1 | 9/2006 | Alizadeh-Shabdiz et al. | |
| 2006/0221918 A1 | 10/2006 | Wang | |
| 2006/0240840 A1 | 10/2006 | Morgan et al. | |
| 2006/0270421 A1 | 11/2006 | Phillips et al. | |
| 2007/0004428 A1 | 1/2007 | Morgan et al. | |
| 2007/0097511 A1 | 5/2007 | Das et al. | |
| 2007/0100955 A1 | 5/2007 | Bodner | |
| 2007/0121560 A1 | 5/2007 | Edge | |
| 2007/0126635 A1 | 6/2007 | Houri | |
| 2007/0150516 A1 | 6/2007 | Morgan et al. | |
| 2007/0178911 A1 | 8/2007 | Baumeister et al. | |
| 2007/0184846 A1 | 8/2007 | Horton et al. | |
| 2007/0202888 A1 | 8/2007 | Brachet et al. | |
| 2007/0210961 A1 | 9/2007 | Romijn | |
| 2007/0232892 A1 | 10/2007 | Hirota | |
| 2007/0258408 A1 | 11/2007 | Alizadeh-Shabdiz et al. | |
| 2007/0258420 A1 | 11/2007 | Alizadeh-Shabdiz et al. | |
| 2007/0259624 A1 | 11/2007 | Alizadeh-Shabdiz et al. | |
| 2008/0004888 A1 | 1/2008 | Davis et al. | |
| 2008/0008117 A1 | 1/2008 | Alizadeh-Shabdiz | |
| 2008/0008118 A1 | 1/2008 | Alizadeh-Shabdiz | |
| 2008/0008119 A1 | 1/2008 | Alizadeh-Shabdiz | |
| 2008/0008120 A1 | 1/2008 | Alizadeh-Shabdiz | |
| 2008/0008121 A1 | 1/2008 | Alizadeh-Shabdiz | |
| 2008/0033646 A1 | 2/2008 | Morgan et al. | |
| 2008/0045234 A1 | 2/2008 | Reed | |
| 2008/0108371 A1 | 5/2008 | Alizadeh-Shabdiz et al. | |
| 2008/0132170 A1 | 6/2008 | Alizadeh-Shabdiz et al. | |
| 2008/0133124 A1 | 6/2008 | Sarkeshik | |
| 2008/0133336 A1 | 6/2008 | Altman et al. | |
| 2008/0139217 A1 | 6/2008 | Alizadeh-Shabdiz et al. | |
| 2008/0139219 A1 | 6/2008 | Boeiro et al. | |
| 2008/0176583 A1 | 7/2008 | Brachet et al. | |
| 2008/0188242 A1 | 8/2008 | Carlson et al. | |
| 2008/0248741 A1 | 10/2008 | Alizadeh-Shabdiz | |
| 2008/0248808 A1 | 10/2008 | Alizadeh-Shabdiz | |
| 2008/0261622 A1 | 10/2008 | Lee et al. | |
| 2009/0075672 A1 | 3/2009 | Jones et al. | |
| 2009/0149197 A1 | 6/2009 | Morgan et al. | |
| 2009/0154371 A1 | 6/2009 | Alizadeh-Shabdiz et al. | |
| 2009/0175189 A1 | 7/2009 | Alizadeh-Shabdiz et al. | |
| 2009/0252138 A1 | 10/2009 | Alizadeh-Shabdiz et al. | |
| 2009/0303112 A1 | 12/2009 | Alizadeh-Shabdiz | |
| 2009/0303113 A1 | 12/2009 | Alizadeh-Shabdiz | |
| 2009/0303114 A1 | 12/2009 | Alizadeh-Shabdiz | |
| 2009/0303115 A1 | 12/2009 | Alizadeh-Shabdiz | |
| 2009/0303119 A1 | 12/2009 | Alizadeh-Shabdiz | |
| 2009/0303120 A1 | 12/2009 | Alizadeh-Shabdiz | |
| 2009/0303121 A1 | 12/2009 | Alizadeh-Shabdiz | |
| 2009/0310585 A1 | 12/2009 | Alizadeh-Shabdiz | |
| 2009/0312035 A1 | 12/2009 | Alizadeh-Shabdiz | |
| 2009/0312036 A1 | 12/2009 | Alizadeh-Shabdiz | |
| 2010/0052983 A1 | 3/2010 | Alizadeh-Shabdiz | |
| 2011/0012780 A1 | 1/2011 | Alizadeh-Shabdiz | |
| 2011/0012784 A1 | 1/2011 | Alizadeh-Shabdiz | |
| 2011/0021207 A1 | 1/2011 | Morgan et al. | |
| 2011/0045840 A1 | 2/2011 | Alizadeh-Shabdiz et al. | |

FOREIGN PATENT DOCUMENTS

| | | |
|---|---|---|
| WO | WO-2007/101107 | 9/2007 |

OTHER PUBLICATIONS

U.S. Appl. No. 11/261,848, filed Oct. 25, 2005, Morgan et al.
U.S. Appl. No. 11/359,154, filed Feb. 22, 2006, Morgan et al.
U.S. Appl. No. 11/359,144, filed Feb. 22, 2006, Morgan et al.
U.S. Appl. No. 11/359,271, filed Feb. 22, 2006, Morgan et al.
U.S. Appl. No. 11/430,079, filed May 8, 2006, Alizadeh-Shabdiz et al.
U.S. Appl. No. 11/430,224, filed May 8, 2006, Alizadeh-Shabciz et al.
U.S. Appl. No. 11/430,222, filed May 8, 2006, Alizadeh-Shabdiz et al.
U.S. Appl. No. 11/429,862, filed May 8, 2006, Alizadeh-Shabdiz et al.
Hellebrandt, M., et al., "Estimating Position and Velocity of Mobile in a Cellular Radio Network," IEEE Transactions on Vehicular Technology, vol. 46, No. 1, Feb. 1997.
Hazas, M., et al., "Location-Aware Computing Comes of Age," IEEE, vol. 37, Feb. 2004.
Kirsner. S., "One more way to find yourself." The Boston Globe, May 23, 2005, Retrieved from www.boston.com.
Krumm, J., et al., "LOCADIO: Inferring Motion and Location from Wi-Fi Signal Strengths," First Annual International Conference on Mobile and Ubiquitous Systems: Networking and Services, Aug. 2004.
Muthukrishnan, K., et al., "Towards Smart Surroundings: Enabling Techniques and Technologies for Localization," Lecture Notes in Computer Science, vol. 3479, May 2005.
"Terminal Equipment and Protocols for Telematic Services: Information Technology—Digital Compression and Coding of Continuous-Tome Still Images—Requirements and Guidelines," International Telecommunication Union, Sep. 1992.
Griswold et al., "ActiveCampus—Sustaining Educational Communities through Mobile Technology." UCSD CSE Technical Report #CS200-0714, 2002. (19 pages).
Kawabata, K. et al., "Estimating Velocity Using Diversity Reception," IEEE, 1994. (371-374).
Kim, M., et al., "Risks of using AP locations discovered through war driving,"; Pervasive Computing; May 19, 2006; p. 67-81 (15 pages).
Kwan, M., "Graphic Programming Using Odd or Even Points," Chinese Math. 1, 1960. (273-277).
LaMarca, A., et al., "Self-Mapping in 802.11 Location Systems," Ubicomp 2005: Ubiquitous Computing; Aug. 23, 2005; pp. 87-104 (18 pages).
LaMarca, A., et al., "Place Lab: Device Positioning Using Radio Beacons in the Wild,"; Pervasive Computing; Oct. 2004; p. 116-133; (18 pages).
Supplementary European Search Report for European Application No. 07757413, dated Apr. 6, 2010, 10 pages.

* cited by examiner

CONTINUOUS DATA OPTIMIZATION OF MOVED ACCESS POINTS IN POSITIONING SYSTEMS

CROSS-REFERENCE TO RELATED APPLICATIONS

This application claims the benefit under 35 U.S.C. §119 (e) to the following Provisional Patent Application, the contents of which are incorporated herein in its entirety by reference:

U.S. Provisional Patent Application No. 60/654,811, filed on Feb. 22, 2005, entitled Continuous Data Optimization in Positioning System.

This application is a continuation-in-part of and claims the benefit under 35 U.S.C. §120 to the following application, the contents of which are incorporated herein in its entirety by reference:

U.S. patent application Ser. No. 11/261,988, filed on Oct. 28, 2005, entitled Location-Based Services that Choose Location Algorithms Based on Number of Detected Access Points Within Range of User Device.

This application is related to the following U.S. Patent Applications, filed on an even date herewith, entitled as follows:

U.S. patent application Ser. No. TBA Continuous Data Optimization by Filtering and Positioning Systems; and U.S. patent application Ser. No. TBA Continuous Data Optimization of New Access Points in Positioning Systems.

This application is related to the following U.S. Patent Applications filed on Oct. 28, 2005, entitled as follows:

U.S. patent application Ser. No. 11/261,848, Filed on Oct. 28, 2005, entitled Location Beacon Database;

U.S. patent application Ser. No. 11/261,898, Filed on Oct. 28, 2005, entitled Server for Updating Location Beacon Database; and U.S. patent application Ser. No. 11/261,987, Filed on Oct. 28, 2005, entitled Method and System for Building a Location Beacon Database.

This application is related to U.S. Provisional Patent Application No. 60/658,481, filed on Mar. 4, 2005, entitled Encoding and Compressing the Access Point Database.

BACKGROUND

1. Field of the Invention

The invention is generally related to location-based services and, more specifically, to methods of continuously optimizing or improving the quality of WiFi location data in such systems.

2. Discussion of Related Art

In recent years the number of mobile computing devices has increased dramatically creating the need for more advanced mobile and wireless services. Mobile email, walkie-talkie services, multi-player gaming and call following are examples of how new applications are emerging on mobile devices. In addition, users are beginning to demand/seek applications that not only utilize their current location but also share that location information with others. Parents wish to keep track of their children, supervisors need to track the location of the company's delivery vehicles, and a business traveler looks to find the nearest pharmacy to pick up a prescription. All of these examples require the individual to know their own current location or that of someone else. To date, we all rely on asking for directions, calling someone to ask their whereabouts or having workers check-in from time to time with their position.

Location-based services are an emerging area of mobile applications that leverages the ability of new devices to calculate their current geographic position and report that to a user or to a service. Some examples of these services include local weather, traffic updates, driving directions, child trackers, buddy finders and urban concierge services. These new location sensitive devices rely on a variety of technologies that all use the same general concept. Using radio signals coming from known reference points, these devices can mathematically calculate the user's position relative to these reference points. Each of these approaches has its strengths and weaknesses based on the radio technology and the positioning algorithms they employ.

The Global Positioning System (GPS) operated by the US Government leverages dozens of orbiting satellites as reference points. These satellites broadcast radio signals that are picked up by GPS receivers. The receivers measure the time it took for that signal to reach to the receiver. After receiving signals from three or more GPS satellites the receiver can triangulate its position on the globe. For the system to work effectively, the radio signals must reach the received with little or no interference. Weather, buildings or structures and foliage can cause interference because the receivers require a clear line-of-sight to three or more satellites. Interference can also be caused by a phenomenon known as multi-path. The radio signals from the satellites bounce off physical structures causing multiple signals from the same satellite to reach a receiver at different times. Since the receiver's calculation is based on the time the signal took to reach the receiver, multi-path signals confuse the receiver and cause substantial errors.

Cell tower triangulation is another method used by wireless and cellular carriers to determine a user or device's location. The wireless network and the handheld device communicate with each other to share signal information that the network can use to calculate the location of the device. This approach was originally seen as a superior model to GPS since these signals do not require direct line of site and can penetrate buildings better. Unfortunately these approaches have proven to be suboptimal due to the heterogeneous nature of the cellular tower hardware along with the issues of multi-path signals and the lack of uniformity in the positioning of cellular towers.

Assisted GPS is a newer model that combines both GPS and cellular tower techniques to produce a more accurate and reliable location calculation for mobile users. In this model, the wireless network attempts to help GPS improve its signal reception by transmitting information about the clock offsets of the GPS satellites and the general location of the user based on the location of the connected cell tower. These techniques can help GPS receivers deal with weaker signals that one experiences indoors and helps the receiver obtain a 'fix' on the closest satellites quicker providing a faster "first reading". These systems have been plagued by slow response times and poor accuracy—greater than 100 meters in downtown areas.

There have been some more recent alternative models developed to try and address the known issues with GPS, A-GPS and cell tower positioning. One of them, known as TV-GPS, utilizes signals from television broadcast towers. (See, e.g., Muthukrishnan, Maria Lijding, Paul Havinga, Towards Smart Surroundings: Enabling Techniques and Technologies for Localization, Lecture Notes in Computer Science, Volume 3479, Jan 2Hazas, M., Scott, J., Krumm, J.: Location-Aware Computing Comes of Age. IEEE Computer, 37(2):95-97, February 2004 005, Pa005, Pages 350-362.) The concept relies on the fact that most metropolitan areas have 3 or more TV broadcast towers. A proprietary hardware chip receives TV signals from these various towers and uses the known positions of these towers as reference points. The challenges facing this model are the cost of the new hardware receiver and the limitations of using such a small set of reference points. For example, if a user is outside the perimeter of towers, the system has a difficult time providing reasonable accuracy. The classic example is a user along the shoreline. Since there are no TV towers out in the ocean, there is no way to provide reference symmetry among the reference points resulting in a calculated positioning well inland of the user.

Microsoft Corporation and Intel Corporation (via a research group known as PlaceLab) have deployed a Wi-Fi Location system using the access point locations acquired from amateur scanners (known as "wardrivers") who submit their Wi-Fi scan data to public community web sites. (See, e.g., LaMarca, A., et. al., Place Lab: Device Positioning Using Radio Beacons in the Wild.) Examples include WiGLE, Wi-FiMaps.com, Netstumbler.com and NodeDB. Both Microsoft and Intel have developed their own client software that utilizes this public wardriving data as reference locations. Because individuals voluntarily supply the data the systems suffer a number of performance and reliability problems. First, the data across the databases are not contemporaneous; some of the data is new while other portions are 3-4 years old. The age of the access point location is important since over time access points can be moved or taken offline. Second, the data is acquired using a variety of hardware and software configurations. Every 802.11 radio and antenna has different signal reception characteristics affecting the representation of the strength of the signal. Each scanning software implementation scans for Wi-Fi signals in different ways during different time intervals. Third, the user-supplied data suffers from arterial bias. Because the data is self-reported by individuals who are not following designed scanning routes, the data tends to aggregate around heavily traffic areas. Arterial bias causes a resulting location pull towards main arteries regardless of where the user is currently located causing substantial accuracy errors. Fourth, these databases include the calculated position of scanned access points rather than the raw scanning data obtained by the 802.11 hardware. Each of these databases calculates the access point location differently and each with a rudimentary weighted average formula. The result is that many access points are indicated as being located far from their actual locations including some access points being incorrectly indicated as if they were located in bodies of water.

There have been a number of commercial offerings of Wi-Fi location systems targeted at indoor positioning. (See, e.g., Kavitha Muthukrishnan, Maria Lijding, Paul Havinga, Towards Smart Surroundings: Enabling Techniques and Technologies for Localization, Lecture Notes in Computer Science, Volume 3479, Jan 2Hazas, M., Scott, J., Krumm, J.: Location-Aware Computing Comes of Age. IEEE Computer, 37(2):95-97, February 2004 005, Pa005, Pages 350-362.) These systems are designed to address asset and people tracking within a controlled environment like a corporate campus, a hospital facility or a shipping yard. The classic example is having a system that can monitor the exact location of the crash cart within the hospital so that when there is a cardiac arrest the hospital staff doesn't waste time locating the device. The accuracy requirements for these use cases are very demanding typically calling for 1-3 meter accuracy. These systems use a variety of techniques to fine tune their accuracy including conducting detailed site surveys of every square foot of the campus to measure radio signal propagation. They also require a constant network connection so that the access point and the client radio can exchange synchronization information similar to how A-GPS works. While these systems are becoming more reliable for these indoor use cases, they are ineffective in any wide-area deployment. It is impossible to conduct the kind of detailed site survey required across an entire city and there is no way to rely on a constant communication channel with 802.11 access points across an entire metropolitan area to the extent required by these systems. Most importantly outdoor radio propagation is fundamentally different than indoor radio propagation rendering these indoor positioning algorithms almost useless in a wide-area scenario.

There are numerous 802.11 location scanning clients available that record the presence of 802.11 signals along with a GPS location reading. These software applications are operated manually and produce a log file of the readings. Examples of these applications are Netstumber, Kismet and Wi-FiFoFum. Some hobbyists use these applications to mark the locations of 802.11 access point signals they detect and share them with each other. The management of this data and the sharing of the information is all done manually. These application do not perform any calculation as to the physical location of the access point, they merely mark the location from which the access point was detected.

Performance and reliability of the underlying positioning system are the key drivers to the successful deployment of any location based service. Performance refers to the accuracy levels that the system achieves for that given use case. Reliability refers to the percentage of time that the desired performance levels are achieved.

|  | Performance | Reliability |
| --- | --- | --- |
| Local Search/Advertising | <100 meters | 85% of the time |
| E911 | <150 meters | 95% of the time |
| Turn-by-turn driving directions | 10-20 meters | 95% of the time |
| Gaming | <50 meters | 90% of the time |
| Friend finders | <500 meters | 80% of the time |
| Fleet management | <10 meters | 95% of the time |
| Indoor asset tracking | <3 meters | 95% of the time |

SUMMARY

The invention provides methods and systems of continuously optimizing data in WiFi positioning systems. For example, data is monitored to infer whether a WiFi access point has moved or is new. In this fashion, data is continuously optimized. Likewise, suspect data may be avoided when determining the position of the WiFi-enabled device using such a system.

Under one aspect of the invention, a location-based services system uses WiFi-enabled devices to monitor WiFi access points in a target area to indicate whether a WiFi access point has moved relative to its previously recorded location. A WiFi-enabled device communicates with WiFi access points within range of the WiFi-enabled device so that observed WiFi access points identify themselves; A reference database is accessed to obtain information specifying a recorded location for each observed WiFi access point in the target area. The recorded location information is used for each of the observed WiFi access points in conjunction with predefined rules to infer whether an observed WiFi access point has moved relative to its recorded location. The reference database is informed of the identity of any observed WiFi access point that is inferred to have moved.

Under another aspect of the invention, the predefined rules include (i) rules to identify clusters of observed WiFi access points, (ii) rules to determine the cluster with the largest number of WiFi access points, (iii) rules to calculate a reference point location from the average of the recorded locations for the observed WiFi access points within the largest cluster; and (iv) rules to infer as moved any observed WiFi access point whose recorded location stored in the reference database is more than a threshold distance from the reference point.

Under another aspect of the invention, the predefined rules include (i) rules to calculate a median location of the observed WiFi access points, and (ii) rules to identify as suspect any observed WiFi access point whose position stored in the reference database is more than a threshold distance from the median location.

Under another aspect of the invention, the predefined rules include (i) rules to store a recent position of the WiFi-enabled device as a reference point, and (ii) rules to identify as suspect any observed WiFi access point whose position stored in the reference database is more than a threshold distance from the median location.

Under another aspect of the invention, the further determines the velocity of WiFi-enabled device and wherein the threshold distance is selected based on the velocity of the WiFi-enabled device.

Under another aspect of the invention, the reference database is located remotely relative to the WiFi-enabled device.

Under another aspect of the invention, the Wi-Fi access points identified as suspect are marked in the reference database immediately.

Under another aspect of the invention, the WiFi access points identified as suspect in the WiFi-enabled device and marked in the reference database at a later time.

Under another aspect of the invention, the reference database is part of a location-based services system with a large plurality of subscribers each having WiFi-enabled devices with logic to determine the geographical position of the WiFi-enabled device of the respective user and wherein acts of identifying moved access points are repeatedly performed by the large plurality of WiFi-enabled devices using the system.

DETAILED DESCRIPTION

Figure 1:
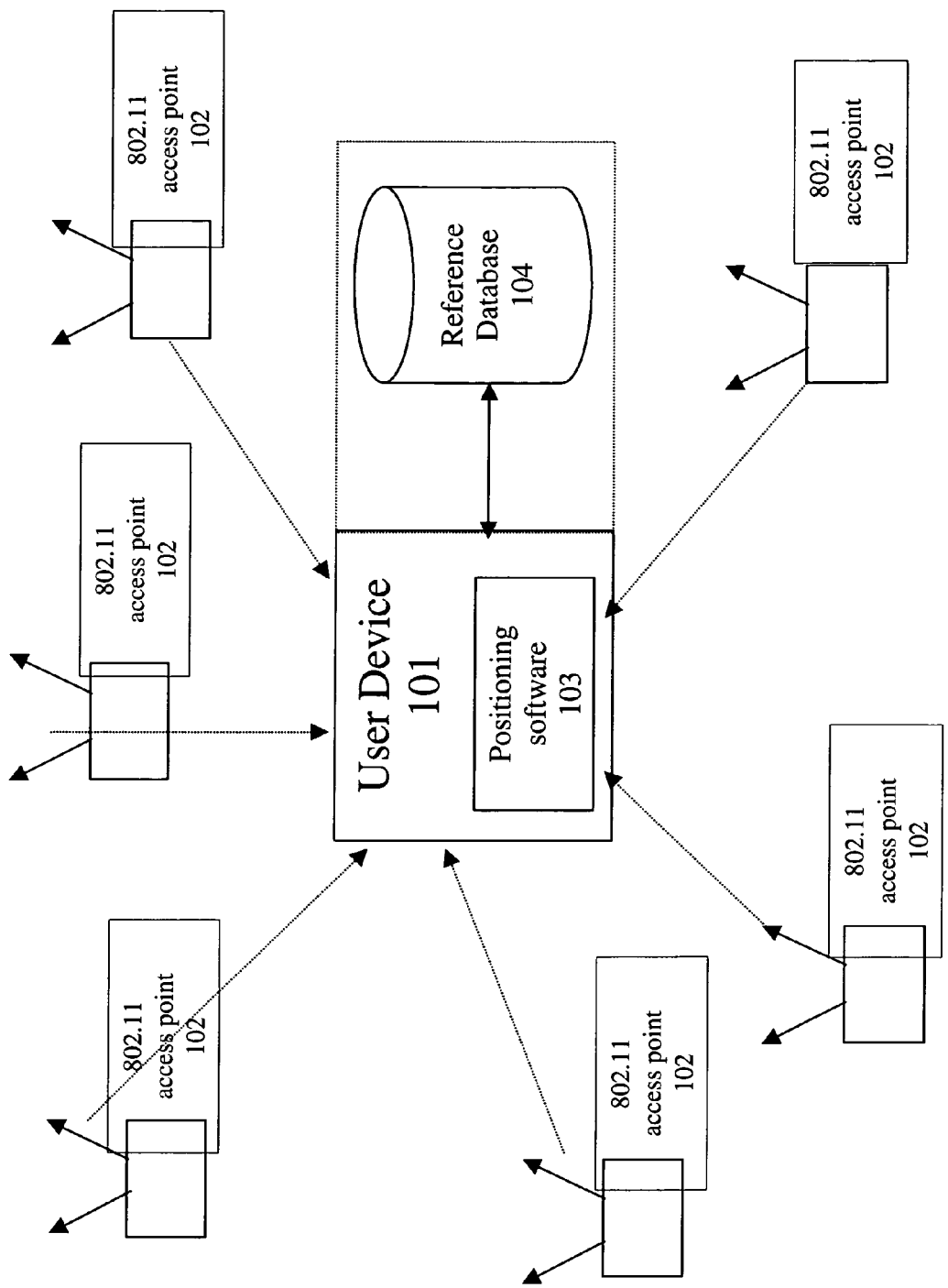
FIG. 1 depicts certain embodiments of a Wi-Fi positioning system.

Preferred embodiments of the present invention provide a system and a methodology for continuously maintaining and updating location data in a WiFi positioning system (WPS) using public and private 802.11 access points. Preferably, clients using location data gathered by the system use techniques to avoid erroneous data in determining the Wi-Fi positions and use newly-discovered position information to improve the quality of previously gathered and determined position information. Certain embodiments communicate with the central location Access Point Reference Database to provide the location of newly discovered access points. Other embodiments notify the central location Access Point Reference Database of access points whose readings fall outside the bounds of what should be expected, based on previous readings of their location. Access points whose readings fall outside of what should be expected can be marked as suspect and filtered out of the triangulation formula so as not to introduce bad data into the location calculation.

Preferred embodiments of the invention build on techniques, systems and methods disclosed in earlier filed applications, including but not limited to U.S. patent application Ser. No. 11/261,988, filed on Oct. 28, 2005, entitled Location-Based Services that Choose Location Algorithms Based on Number of Detected Access Points Within Range of User Device, the contents of which are hereby incorporated by reference in its entirety. Those applications taught specific ways to gather high quality location data for WiFi access points so that such data may be used in location based services to determine the geographic position of a WiFi-enabled device utilizing such services. In the present case, new techniques are disclosed for continuously monitoring and improving such data, for example by users detecting new access points in a target area or inferring that access points have moved. The present techniques, however, are not limited to systems and methods disclosed in the incorporated patent applications. Instead those applications disclose but one framework or context in which the present techniques may be implemented. Thus, while reference to such systems and applications may be helpful, it is not believed necessary to understand the present embodiments or inventions.

Under one embodiment of the invention, a WPS client device scans for access points to determine the physical location of the WPS client device, then it calculates the quality of the current access point locations in the Access Point Reference Database by comparing the observed readings against the recorded readings in the database. If the client determines that the observed readings fall outside the bounds of what should be expected based on the recorded readings, then the access point is marked as suspect. That suspect reading is logged into a feedback system for reporting back to the central location Access Point Reference Database.

Under another embodiment of the invention, a WPS client device filters identified suspect access points out of the triangulation calculation of the WPS client device in real time so as not to introduce bad data into the location calculation.

Under another embodiment of the invention, a WPS client device scans for access points to determine the physical location of the device and identifies access points that do not exist in the current Access Point Reference Database. After the known access points are used to calculate the device's current location, those newly found access points are recorded back to the central location Access Point Reference Database using the calculated location of the known access points to help determine their position, along with the observed power reading.

Under another embodiment of the invention, a device centric WPS client device periodically connects to the central location Access Point Reference Database to download the latest access point data. The WPS client device also uploads all feedback data about newly observed access points and suspect access points. This data is then fed into the central location Access Point Reference Database processing to recalibrate the overall system.

Under another embodiment of the invention, a network centric WPS client device directly records feedback data about newly observed access points and suspect access points into the central location Access Point Reference Database in real time.

By enlisting the WPS client device to continuously update the Access Point Reference Database with information on new and suspect access points, the WiFi positioning system provides higher quality data than a system scanned solely by the provider. Over time, WiFi access points are continually added and moved. Embodiments of the described invention provide systems and methods to ensure that the Access Point Reference Database is self-healing and self-expanding, providing optimal positioning data that continually reflects additions and changes to available access points. As more user client devices are deployed, the quality of the Access Point Reference Database improves because information in the database is updated more frequently.

FIG. 1 depicts a portion of a preferred embodiment of a Wi-Fi positioning system (WPS). The positioning system includes positioning software [103] that resides on a user-computing device [101]. Throughout a particular coverage area there are fixed wireless access points [102] that broadcast information using control/common channel broadcast signals. The client device monitors the broadcast signal or requests its transmission via a probe request. Each access point contains a unique hardware identifier known as a MAC address. The client positioning software receives signal beacons or probe responses from the 802.11 access points in range and calculates the geographic location of the computing device using characteristics from the received signal beacons or probe responses.

The positioning software is described in greater detail with reference to FIG. 2, which depicts exemplary components of positioning software 103. Typically, in the user device embodiment of FIG. 1 there is an application or service [201] that utilizes location readings to provide some value to an end user (for example, driving directions). This location application makes a request of the positioning software for the location of the device at that particular moment. The location application can be initiated continuously every elapsed period of time (every 1 second for example) or one time on demand by another application or user.

Figure 2:
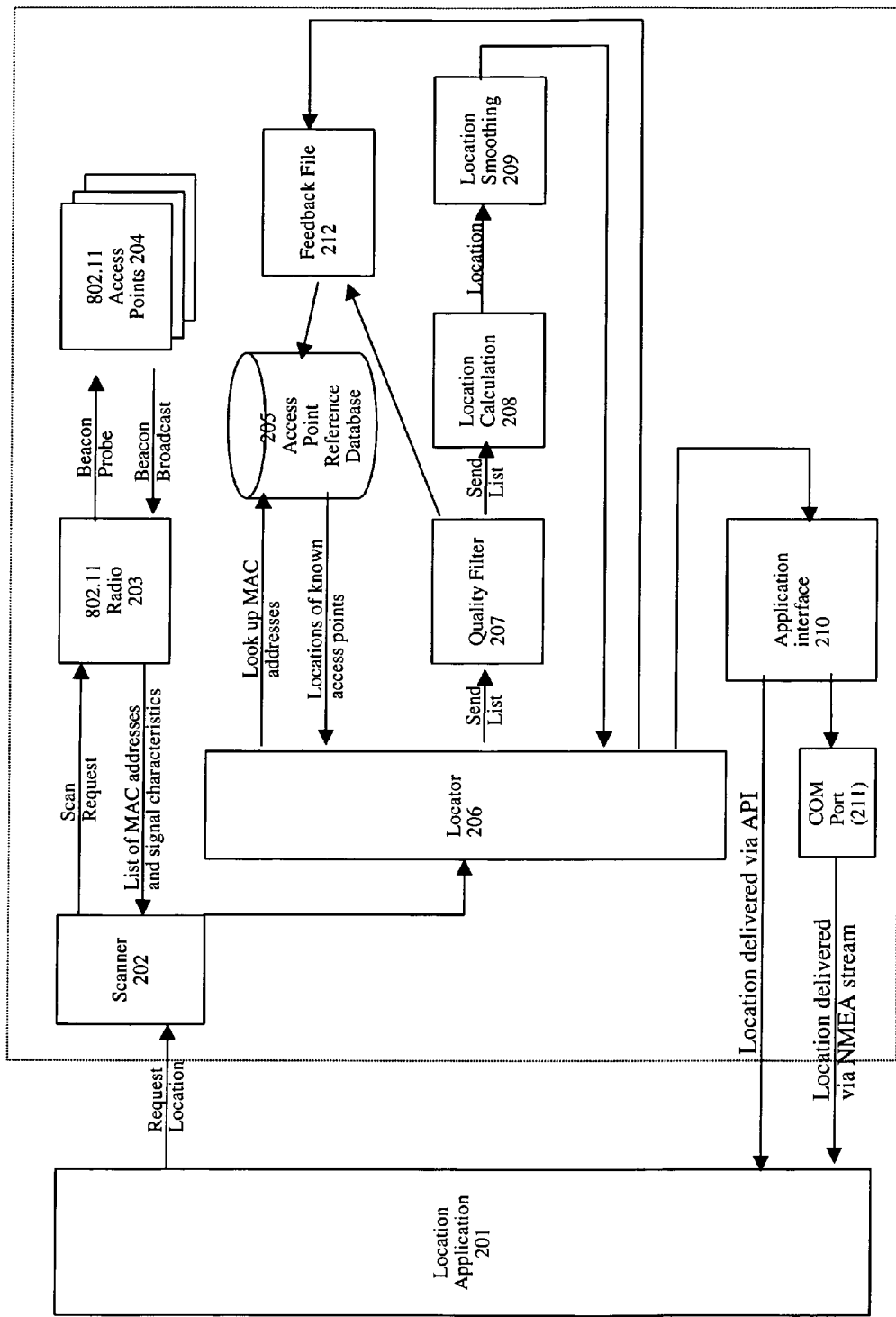
FIG. 2 depicts an exemplary architecture of positioning software according to certain embodiments of the invention.

In FIG. 2, the location makes a request of the positioning software to interrogate all access points within range at a particular moment and to determine which access points are suspect because the observed data does not correspond to the calculated location in the Reference Database. The information on suspect access points collected by the location application is used to optimize the position information in the Access Point Reference Database either in real time or at some later time.

In the embodiment depicted in FIG. 2, the location application or service request initiates the scanner [202], which makes a "scan request" to the 802.11 radio [203] on the device. The 802.11 radio sends out a probe request to all 802.11 access points [204] within range. According to the 802.11 protocol, those access points in receipt of a probe request will transmit a broadcast beacon containing information about the access point. That beacon includes the MAC address of the device, the network name, the precise version of the protocol that it supports and its security configuration along with information about how to connect to the device. The 802.11 radio collects this information from each access point that responds, calculates the received signal strength ("RSS") of each access point observed, and sends the identification and RSS information back to the scanner.

Figure 5:
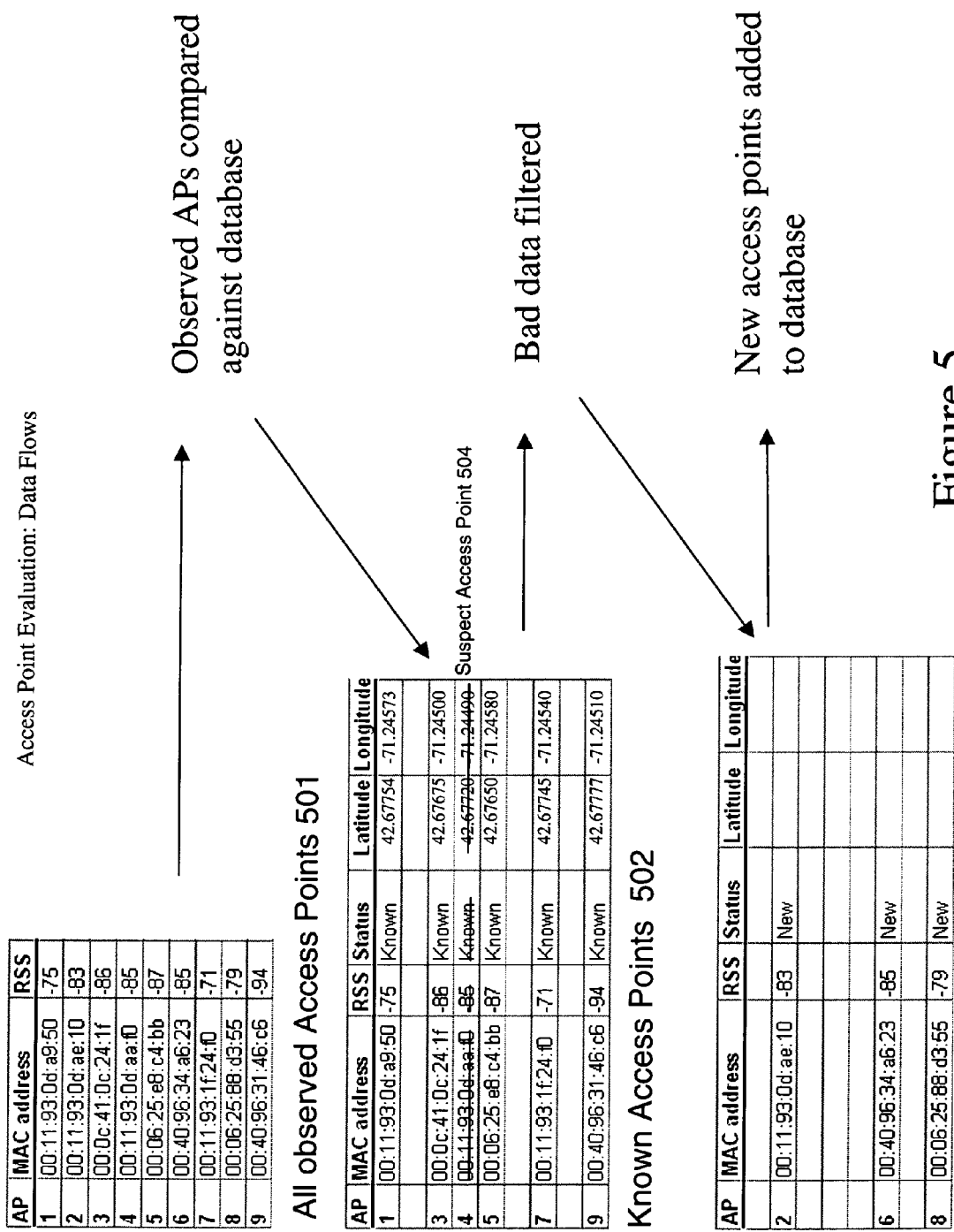
FIG. 5 depicts the data flows for the quality filtering and feedback process.

The scanner passes this array of access points to the Locator [206] which checks the MAC addresses of each observed access point against the Access Point Reference Database [205]. This database can either be located on the device or remotely over a network connection. The Access Point Reference Database contains the raw 802.11 scanning data plus the calculated location for each access point that is known to the system. FIG. 5 describes the access point evaluation process in more detail. The list of observed access points [501] is obtained from the Scanner and the Locator [206] searches for each access point in the Access Point Reference Database. For each access point found in the Access Point Reference Database the recorded location is retrieved [502]. The Locator passes this collection of location information for known access points [502] along with the signal characteristics returned from each access point to the Quality Filter [207]. This filter determines if any of the access points have moved since they were added to the Access Point Reference Database and works continually to improve the overall system. The Quality Filter marks access points that fail the quality algorithm as "suspect" [504]. After removing bad data records, the Filter sends the remaining access points to the Location Calculation component [208]. Using the set of validated reference data from the Access Point Reference Database and the signal strength readings from the Scanner, the Location Calculation component computes the location of the device at that moment. The Location Calculation component also calculates the position of any newly observed access points [503] not found in the Access Point Reference Database. The raw scanning data and the location of new access points are stored in the Feedback File [212] as can be seen in FIG. 2. This feedback is either saved locally on the device for later transmission to the server or sent to the server in real time. Before location data for known access points is sent back to the Locator, it is processed by the Smoothing engine [209] which averages a past series of location readings to remove any erratic readings from the previous calculation. The adjusted location data is then sent back to the Locator.

The calculated location readings produced by the Locator are communicated to these location-based applications [201] through the Application Interface [210] which includes an application programming interface (API) or via a virtual GPS capability [211]. GPS receivers communicate their location readings using proprietary messages or using the location standard like the one developed by the National Marine Electronics Association (NMEA). Connecting into the device using a standard interface such as a COM port on the machine retrieves the messages. Certain embodiments of the invention include a virtual GPS capability that allows any GPS compatible application to communicate with this new positioning system without have to alter the communication model or messages.

The location calculations are produced using a series of positioning algorithms intended to turn noisy data flows into reliable and steady location readings. The client software compares the list of observed access points along with their calculated signal strengths to weight the location of user to determine precise location of the device user. A variety of techniques are employed including simple signal strength weighted average models, nearest neighbor models combined with triangulation techniques and adaptive smoothing based on device velocity. Different algorithms perform better under different scenarios and tend to be used together in hybrid deployments to product the most accurate final readings. Preferred embodiments of the invention can use a number of positioning algorithms. The decision of which algorithm to use is driven by the number of access points observed and the user case application using it. The filtering models differ from traditional positioning systems since traditional systems rely on known reference points that never move. In the model of preferred embodiments, this assumption of fixed locations of access points is not made; the access points are not owned by the positioning system so they may move or be taken offline. The filtering techniques assume that some access points may no longer be located in the same place and could cause a bad location calculation. So the filtering algorithms attempt to isolate the access points that have moved since their position was recorded. The filters are dynamic and change based on the number of access points observed at that moment. The smoothing algorithms include simple position averaging as well as advanced Bayesian logic including particle filters. The velocity algorithms calculate device speed by estimating the Doppler effect from the signal strength observations of each access point.

Optimizing the Quality of Current Access Point Data

The Quality Filter [207] component compares the data from the observed access points against the known access points in a local or remote Access Point Reference Database. For those observed access points whose MAC address is located in the Access Point Reference Database, the Quality Filter component then compares the information observed with the location of the access points stored in the database.

The Quality Filter's [207] high level functionality is to remove suspect access points from location calculation and as the result, increase the accuracy of location estimation. The Quality Filter uses only access points that are located in the Access Point Reference Database. In some cases the Quality Filter will have no current client device location history to utilize for quality determination. The process for identifying suspect access points for a no-history location estimation is based on the location of the biggest cluster of the access points stored in the database. The location of all the observed access points that are recorded in the Access Point Reference Database is considered and the average location of the biggest cluster of access points is used as the reference point. A cluster refers to distance-based clustering, which is a group of access points with the distance of each access point from at least one more access point in the cluster less than a threshold. The clustering algorithm is shown as follows and it is read as "Node n belongs to cluster K, if there is at least one element in cluster K like $n_i$, which its distance from n is less than the threshold":

$$\exists n_i \in (\text{cluster} K), |n-n_i| < d_{threshold} \Rightarrow n \in (\text{cluster} K)$$

If no cluster can be found then the mathematical median of the access points serves as the best estimate of the distance average of a majority of the access points.

If the distance of any individual access point to the reference point is calculated to be more than a given distance, it is ruled as a suspect access point and recorded in the Feedback File to be sent back to the Access Point Reference Database. Those suspect access points are then removed from the list of access points used to calculate the location of the user device.

Figure 6:
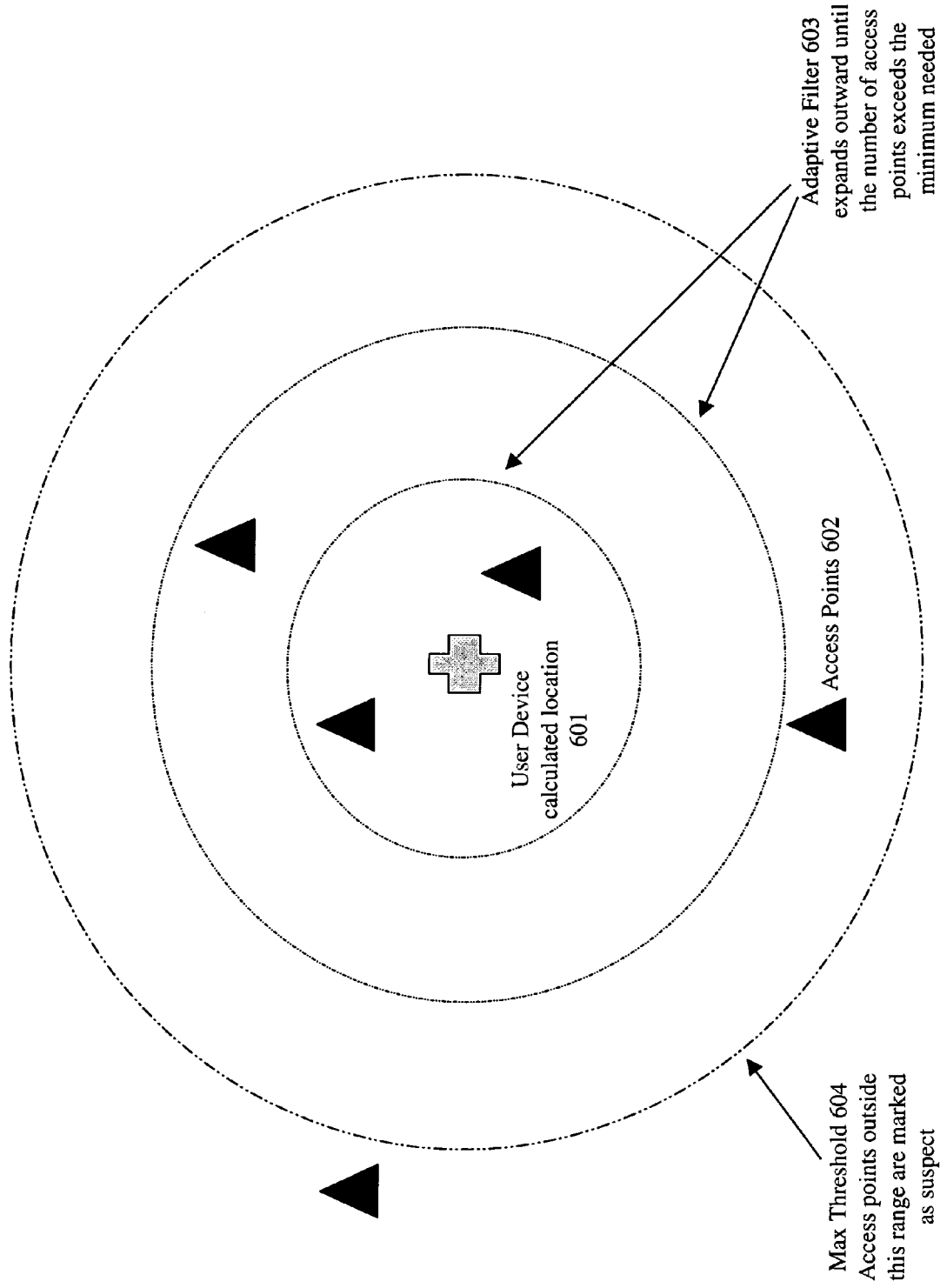
FIG. 6 depicts the operation of the Adaptive Filter in certain embodiments.

Identifying suspect access points for a client device when there is a history of user movement is based on the previous location of the client device. An exemplary implementation of this determination is shown in FIG. 6. In an embodiment where there is location history, the client device location calculation is calculated continuously every period of time, usually once every second. If the distance of any individual observed access point [602] to that historical reference point (the prior location calculation) is more than a given distance [603], then it is ruled as a suspect access point, added to the Feedback File and removed from calculation. The intent of this filter is to try and use the access points that are nearest to the user/device [601] to provide the highest potential accuracy. This filter is called an adaptive filter since the threshold distance to filter suspect access points is changed dynamically. The threshold distance, which is used to identify suspect access points, is changed dynamically based on the number of access points that are considered of good quality to calculate location of the client device. Therefore, the adaptive filter contains two factors, 1) the minimum number of required access points to locate a user device and 2) the minimum threshold of distance to identify suspect access points. The adaptive filter starts with the minimum threshold of distance. If number of access points within that distance is above the minimum number of access points necessary to calculate the client location, then location of the device is calculated. For example, if we find five access points which are within 20 meters of the prior reading, then we filter out all observed access points greater than 20 meters. If the filter criteria is not met then the adaptive filter threshold [603] of the distance is increased until the minimum number of access points is considered or the maximum acceptable distance is reached, and then the access points within the threshold distance are used to locate the user device. If no access point can be located within the maximum threshold of distance [604] from the previous location, then no location is calculated.

The positioning software continues to attempt to locate the device based on its previous location up to a maximum given duration of time. During this timeout period, if no location can be determined, the maximum threshold of distance is adjusted using the calculated velocity of the device. If the vehicle is known to accelerate at a maximum of 6 m/s/s and it was previously calculated as traveling at 20 mph, then it would not possible be more than 42 meters away from the last location two seconds later. This 42 meter distance limit is used to adjust the outer boundary of the distance threshold if the earlier time period adapter filters did not work. If it is too difficult to calculate the actual velocity of client device, then a maximum velocity threshold is used. If any access point is calculated to be more than the maximum threshold of distance away from the reference point, it is marked as "suspect" and logged to the Feedback File. If no access point can be located within the maximum threshold of the distance during the timeout period, then the adaptive filter ignores the history and treats the next instance of location determination as a no-history case and returns back to the clustering filter described previously.

Real-Time Filtering of Suspect Access Points

Suspect access points are removed from the inputs into the triangulation calculation and only valid access point locations are used to triangulate the device position [502]. The inputs to the triangulation algorithm are the set of valid access points returned from the Quality Filter [207]. The triangulation component reads in the list of valid observed access point locations along with their respective signal strengths and calculates a latitude and longitude along with a Horizontal Position Error (an estimate of the accuracy error at that moment). The triangulation process also takes into consideration prior positions to add additional filters to the scanning in order to apply a smoothing process. By filtering out suspect access points we provide the triangulation algorithm a more reliable set of reference points to calculate against. Since access points can move at any time, Positioning Software must account for the dynamic nature of the reference points. Without conducting filtering, the calculated location could result in a position hundreds or thousands of miles away.

Suspect access points are not discarded completely. Rather their newly observed locations are added back to the database via the Feedback File [212] with different attributes indicating it as suspect, allowing the server to determine whether to move the official location of that access point or just keep it on hold until its new location can be verified. By keeping it on hold, this access point will not corrupt any other user's location calculation.

Adding New Access Point Data

Observed access points found in the Access Point Reference Database of known access points are used to calculate the location of the client device after the elimination of suspect access points. Observed access points whose MAC address are not found in the Access Point Reference Database represent new access points [302][503] added since the database was created or updated. Those observed access points not found in the known Access Point Reference Database are added to the Feedback File as new access points. Those newly found access points are marked with the location of the client device calculated by the positioning system itself along with the observed signal strengths. This situation can occur in a number of scenarios. In many cases a new access point is purchased and deployed in the vicinity since the last physical scanning by the scanning fleet. This is most often the case due to the rapid expansion of Wi-Fi. In other cases, an access point may be situated deep in the center of a building and the scanning fleet was unable to detect that access point from the street. Another example is that an access point may be located up on a high floor of a tall building. These access points may be difficult to detect from down on the street where the scanning fleet operates, but may be received by client devices that pass closer to the building by users on foot or that enter the building itself.

By having the system "self-expand" in this manner, the coverage area of the system slowly expands deep into buildings and upwards in tall buildings. It also leverages the large number of new access points that are deployed every day across the world.

Updating the Central Database Server

Figure 3:
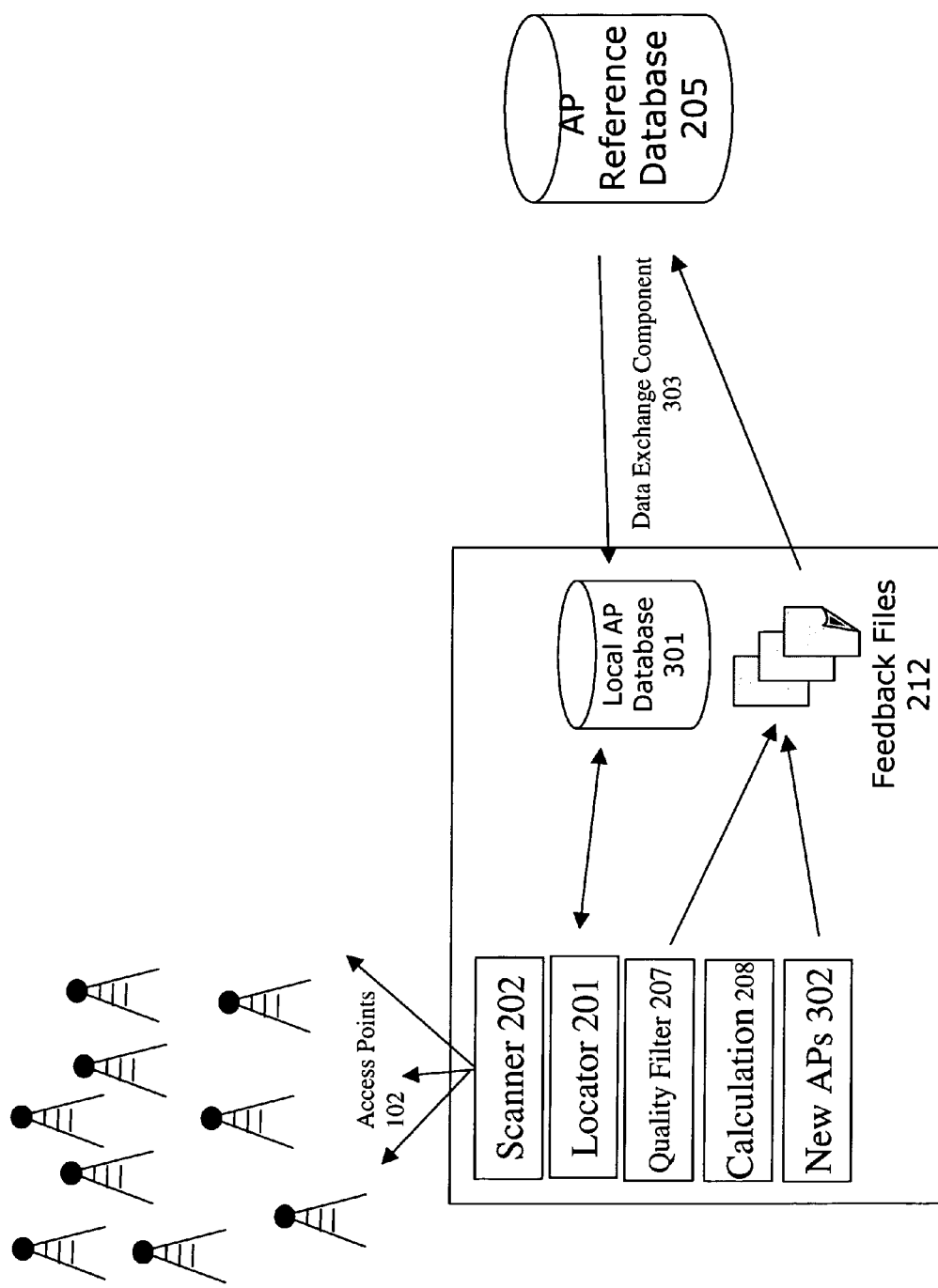
FIG. 3 depicts the data transfer process in certain client device centric embodiments.

With reference to FIG. 3, in some embodiments the Access Point Reference Database of known access points will be located on a central network server remote from the client device. The provisioning of this connection could be done via any available network connection and is managed by the Data Exchange Component [303]. Once authenticated, the client device [103] identifies all the suspect and new access point data from the local storage Feedback Files [212] and uploads that data to the Access Point Reference Database [205].

Figure 4:
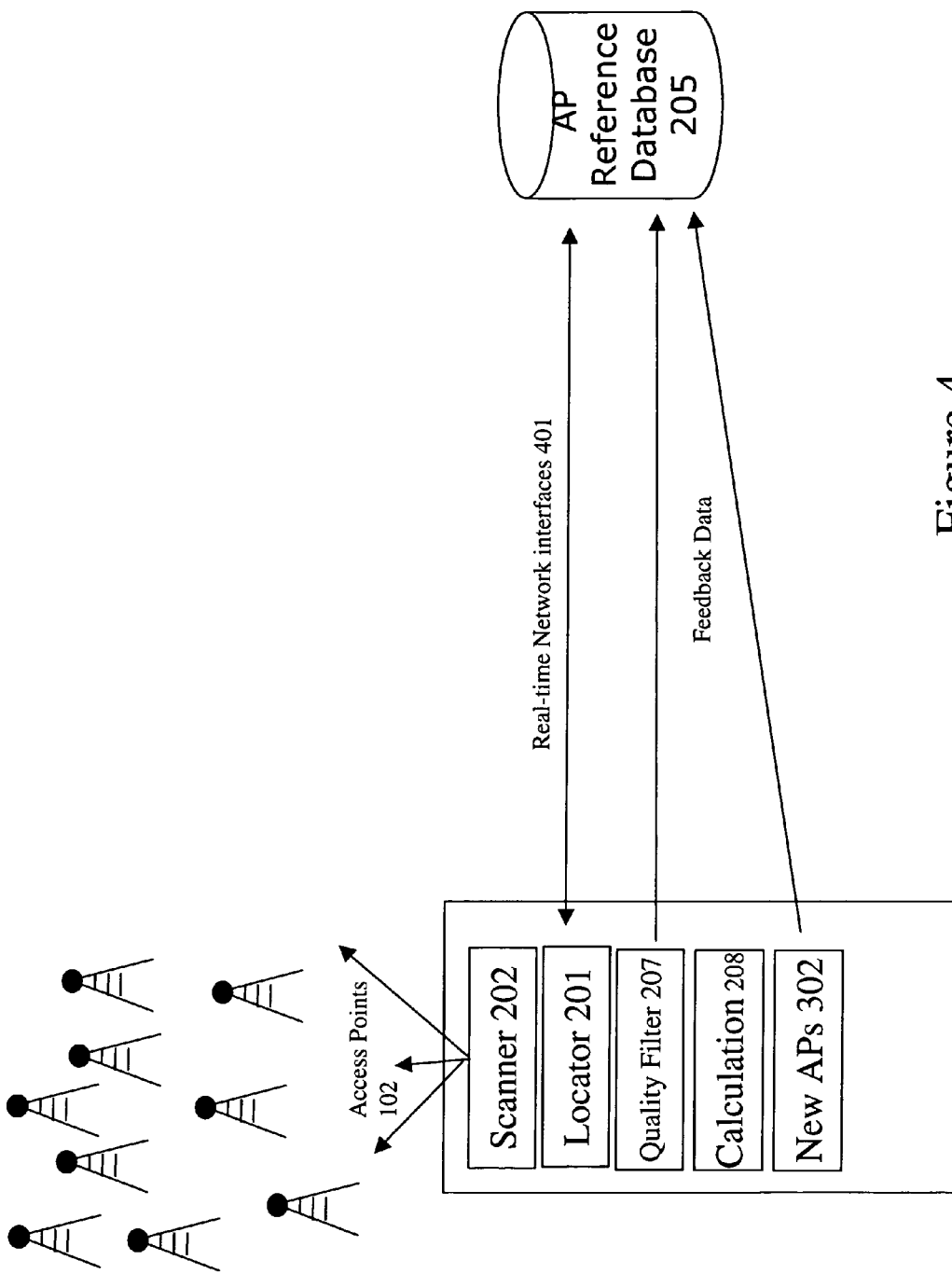
FIG. 4 depicts the data transfer process in certain network centric embodiments.

In other embodiments the client device is connected to the Access Point Reference Database all the time using a network connection. FIG. 4 describes how the Network Centric embodiment works. Rather than store the reference data locally, the Locator [201] uses a set of Real-Time Network interfaces [401] to communicate with the Access Point Reference Database. The Locator sends the list of observed access points to the network interface which returns the list of observed access points and whether the database has recorded locations or whether the access points are newly found. The process continues as before with the Quality Filter marking suspect access points but the list of suspect access points is sent to the Access Point Reference Database in real-time.

After the Calculation module determines the user device's location, the list of newly found access points is marked with the current location and sent back to the database in real-time. This allows the database to be up to date at all times and to remove the need for a Data Exchange Component.

After receiving feedback data, in either the device centric or the network centric model, the Access Point Reference Database determines whether to place suspect access points 'on hold' so as to prevent them from corrupting another user device's location request. There are a number of techniques being explored to optimize how this feedback data of suspect access points will be used to improve the overall quality of the database. There may be a voting scheme by which access points are moved to new positions if more than one user locates the access point in its new location. If only one user has marked the access point as suspect then the access point is marked as a low quality reading in its new position. Once its new position is validated by another user then the quality attribute of the access point is increased to reflect the higher level of confidence the system has in the new position. The more people who corroborate the access point's new position the higher the quality level. The system's client software then favors access points with high quality ratings over those that have lower quality ratings.

In either the device centric or the network centric model, the Access Point Reference Database collects the access point identifying information, client device location and access point signal strength information of newly discovered access points from client devices. Once an acceptable number of readings of newly discovered access points is collected by the Access Point Reference Database, it can calculate a location for the new access points based on the systems and methods described in the related applications. The newly discovered access points can then be supplied to client devices for use in their location calculation.

It will be appreciated that the scope of the present invention is not limited to the above-described embodiments, but rather is defined by the appended claims; and that these claims will encompass modifications of and improvements to what has been described.

What is claimed is:

1. A method of detecting WiFi access points that identifies and distinguishes between (a) WiFi access points that seem to have reliable associated location information that can be used in estimating the position of a mobile WiFi-enabled device and (b) WiFi access points that seem to have moved substantially relative to recorded location information associated with the WiFi access points such that their true location is not reliably known and their associated location information should not be used in estimating the position of the mobile WiFi-enabled device, the method comprising:

a mobile WiFi-enabled device receiving signals from WiFi access points within range of the mobile WiFi-enabled device so that a plurality of WiFi access points identify themselves;

in response to identifying the plurality of WiFi access points, at least one of the mobile WiFi-enabled device and a server in communication with the mobile WiFi-enabled device accessing a reference database system to obtain location information associated with each of the identified WiFi access points, said location information specifying a previously-determined approximate location of the associated WiFi access point;

at least one of the mobile WiFi-enabled device and the server in communication with the mobile WiFi-enabled device comparing the location information associated with each identified WiFi access point to the location information associated with other WiFi access points of the plurality to identify any WiFi access points that are suspected to have moved substantially from their specified location such that their true location is not reliably known at present nor reliably specified in the associated location information, said identifying determining that the specified location of the suspect WiFi access point is too extreme in distance relative to specified locations associated with other identified WiFi access points relative to a typical signal range of WiFi access points to infer that the specified location associated with the suspect WiFi access point does not reliably reflect the true location of the suspect WiFi access point and that the suspect WiFi access point must have moved substantially from its specified location to a presently unknown true location; and at least one of the mobile WiFi-enabled device and the server in communication with the mobile WiFi-enabled device indicating in the reference database system as unreliable for position determination any of the WiFi access points that are suspected to have moved to a presently unknown true position thereby indicating that the location information associated with the unreliable WiFi access points should not be used in estimating the position of the mobile WiFi-enabled device.

2. The method of claim 1, wherein the determining that the specified location of the suspect WiFi access point is too extreme in distance relative to specified locations associated with other identified WiFi access points further includes (i) identifying clusters of observed WiFi access points, (ii) determining the cluster with the largest number of WiFi access points, (iii) calculating a reference point location from the average of the recorded location information for the WiFi access points within the largest cluster; and (iv) inferring as suspect any WiFi access points of the subset whose recorded location information stored in the reference database system is more than a threshold distance from the reference point.

3. The method of claim 1, wherein the determining that the specified location of the suspect WiFi access point is too extreme in distance relative to specified locations associated with other identified WiFi access points further includes (i) calculating a median location of the identified WiFi access points, and (ii) identifying as suspect any WiFi access points whose recorded location information in the reference database system is more than a threshold distance from the median location.

4. The method of claim 1, wherein the determining that the specified location of the suspect WiFi access point is too extreme in distance relative to specified locations associated with other identified WiFi access points further includes (i) storing a recent position of the mobile WiFi-enabled device as a reference point, and (ii) identifying as suspect any identified WiFi access point whose recorded location information in the reference database system is more than a threshold distance from the reference point.

5. The method of claim 4, wherein the method further determines the velocity of the mobile WiFi-enabled device and wherein the threshold distance is selected based on the velocity of the mobile WiFi-enabled device.

6. The method of claim 1, wherein the reference database system is located remotely relative to the mobile WiFi-enabled device.

7. The method of claim 1, wherein Wi-Fi access points indicated as unreliable are indicated in the reference database system immediately.

8. The method of claim 1, wherein WiFi access points indicated as unreliable are indicated as unreliable in the mobile WiFi-enabled device immediately and are indicated as unreliable in the reference database system at a later time.

9. The method of claim 1, wherein the reference database system is part of a location-based services system with a large plurality of subscribers each having mobile WiFi-enabled devices with logic to determine the geographical position of the mobile WiFi-enabled device of the respective user and wherein the acts of receiving signals, accessing a reference database system, and comparing the recorded location information are repeatedly performed by the mobile WiFi-enabled devices of the large plurality of subscribers using the location-based services system.

10. The method of claim 1, wherein the acts of accessing a reference database system, and comparing the recorded location information are performed by the mobile WiFi-enabled device.

11. The method of claim 1, wherein the acts of accessing a reference database system and comparing the recorded location information are performed by the server in communication with the mobile WiFi-enabled device.

12. The method of claim 1, further comprising estimating a geographic position of the mobile WiFi-enabled device based on the location information associated with the identified WiFi access points of other than those WiFi access points that are suspected to have moved to a presently unknown true position.

13. The method of claim 1, further comprising estimating a geographic position of the WiFi access point that is suspected to have moved to a presently unknown true position.

14. The method of claim 13, wherein the estimating a geographic position of the WiFi access point that is suspected to have moved to a presently unknown true position is based at least in part on location information associated with identified WiFi access points other than those WiFi access points that are suspected to have moved to a presently unknown true position.

* * * * *